United States Patent
Bharat et al.

(10) Patent No.: US 10,162,802 B1
(45) Date of Patent: Dec. 25, 2018

(54) SYSTEMS AND METHODS FOR SYNDICATING AND HOSTING CUSTOMIZED NEWS CONTENT

(75) Inventors: Krishna Bharat, San Jose, CA (US);
Michael Schmitt, Neufakru (DE); Mike Curtiss, Mountain View, CA (US);
Marissa Mayer, Palo Alto, CA (US);
Anurag Acharya, Campbell, CA (US);
Srdjan Mitrovic, Redwood City, CA (US); Vijay Boyapati, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 945 days.

(21) Appl. No.: 13/615,846

(22) Filed: Sep. 14, 2012

Related U.S. Application Data

(63) Continuation of application No. 13/371,584, filed on Feb. 13, 2012, now Pat. No. 8,832,058, which is a continuation of application No. 10/748,661, filed on Dec. 31, 2003, now Pat. No. 8,126,865.

(51) Int. Cl.
*G06F 17/21* (2006.01)

(52) U.S. Cl.
CPC ............ *G06F 17/212* (2013.01); *G06F 17/21* (2013.01)

(58) Field of Classification Search
CPC ...................................................... G06F 17/21
USPC ........................................................ 715/706
See application file for complete search history.

(56) References Cited

U.S. PATENT DOCUMENTS

| 5,634,051 | A  | 5/1997 | Thompson |
| 6,098,064 | A  | 8/2000 | Pirolli et al. |
| 6,363,398 | B1 | 3/2002 | Anderson |
| 6,381,594 | B1 | 4/2002 | Eichstaedt et al. |
| 6,516,337 | B1 | 2/2003 | Tripp et al. |

(Continued)

FOREIGN PATENT DOCUMENTS

| EP | 0 889 421 | 1/1999 |
| EP | 1 176 520 | 1/2002 |

(Continued)

OTHER PUBLICATIONS

Tara Calishain et al., "Google Hacks—100 Selected Techniques and Tools used by Professionals," O'Reily Japan Co. Ltd., Aug. 20, 2003, pp. 97-99, 143-146. (Includes partial English translation).

(Continued)

*Primary Examiner* — James J Debrow
(74) *Attorney, Agent, or Firm* — Patent Law Works LLP

(57) ABSTRACT

A system provides client access to customized news content. The system includes a custom news source server and a news search server. The custom news source server periodically sends one or more customized search queries to a news search server. The news search server fetches news content from multiple news source servers and aggregates the news content. The news search server also periodically receives the one or more search queries from the custom news source server, searches the aggregated news content based on the one or more search queries, and periodically provides selected news content to the custom news server based on results of the searches. The custom news source server permits access to clients, from across a network, to the selected news content provided by the news search server.

20 Claims, 10 Drawing Sheets

(56) References Cited

U.S. PATENT DOCUMENTS

| | | | |
|---|---|---|---|
| 6,564,251 | B2 | 5/2003 | Katariya et al. |
| 6,581,072 | B1 | 6/2003 | Mathur et al. |
| 6,643,661 | B2 | 11/2003 | Polizzi et al. |
| 6,691,106 | B1 | 2/2004 | Sathyanarayan |
| 6,868,525 | B1 | 3/2005 | Szabo |
| 6,961,712 | B1 | 11/2005 | Perkowski |
| 6,976,210 | B1 * | 12/2005 | Silva et al. ............ 715/205 |
| 6,981,040 | B1 | 12/2005 | Konig et al. |
| 6,990,633 | B1 * | 1/2006 | Miyasaka et al. ......... 715/201 |
| 7,058,944 | B1 | 6/2006 | Sponheim et al. |
| 7,085,944 | B1 | 8/2006 | Hamilton |
| 7,483,871 | B2 | 1/2009 | Herz |
| 8,103,742 | B1 * | 1/2012 | Green ............ G06F 17/30893 709/218 |
| 8,126,865 | B1 | 2/2012 | Bharat et al. |
| 2001/0037248 | A1 | 11/2001 | Klein |
| 2002/0035501 | A1 | 3/2002 | Handel et al. |
| 2002/0073399 | A1 | 6/2002 | Golden |
| 2002/0103809 | A1 | 8/2002 | Starzl et al. |
| 2002/0120543 | A1 * | 8/2002 | Brittingham et al. ......... 705/36 |
| 2002/0124055 | A1 | 9/2002 | Reisman |
| 2002/0161770 | A1 * | 10/2002 | Shapiro et al. ............ 707/10 |
| 2002/0184208 | A1 * | 12/2002 | Kato .................. G06F 7/00 |
| 2003/0009497 | A1 | 1/2003 | Yu |
| 2003/0074352 | A1 | 4/2003 | Raboczi et al. |
| 2003/0084048 | A1 | 5/2003 | Dweck et al. |
| 2003/0093417 | A1 | 5/2003 | Kagimasa et al. |
| 2004/0006743 | A1 | 1/2004 | Oikawa et al. |
| 2004/0059705 | A1 * | 3/2004 | Wittke ................. G06N 5/00 |
| 2004/0093327 | A1 * | 5/2004 | Anderson ............ G06Q 30/02 |
| 2005/0005237 | A1 | 1/2005 | Rail et al. |
| 2005/0027666 | A1 | 2/2005 | Beck et al. |
| 2005/0033657 | A1 * | 2/2005 | Herrington ....... G06F 17/30058 705/26.7 |
| 2005/0050021 | A1 * | 3/2005 | Timmons ......... G06F 17/30899 |
| 2005/0065908 | A1 | 3/2005 | Silverbrook et al. |
| 2005/0137996 | A1 | 6/2005 | Billsus et al. |
| 2005/0138036 | A1 | 6/2005 | Sizemore, Jr. |
| 2005/0138049 | A1 * | 6/2005 | Linden ............ G06F 17/30867 |
| 2005/0165743 | A1 | 7/2005 | Bharat et al. |
| 2005/0267798 | A1 * | 12/2005 | Panara ............ G06Q 30/0264 705/14.61 |

FOREIGN PATENT DOCUMENTS

| | | |
|---|---|---|
| JP | 2001-312509 A | 11/2001 |
| JP | 2002-123463 A | 4/2002 |

OTHER PUBLICATIONS

Tomonari Kanba et al., "Information Order Made for Each Individual—Personalization Technology—Electronic Data Communication Academic Journal," Japan, Institute of Electronics, Information and Communication Engineers, Apr. 25, 1999, vol. 82, No. 4, pp. 354-359. (Includes partial English translation).

Tomonari Kanba, "Personal Electronic Newspaper," NEC Creating Co. Ltd., Jul. 30, 1996, vol. 49, No. 7, pp. 11-16. (Includes partial English translation).

Tomonari Kanba, "The Krakatoa Chronicle: Interactive Type Personal Newspaper Using WWW Agent Functions," Information Processing Society of Japan Research, Institute of Electronics, Information and Communication Engineers, Dec. 1, 1995, vol. 95, No. 115, pp. 13-18. (Includes partial English translation).

Co-pending U.S. Appl. No. 13/371,584 entitled "Systems and Methods for Syndicating and Hosting Customized News Content" by Bharat et al., filed Feb. 12, 2012, 34 pages.

Co-pending U.S. Appl. No. 14/215,100 entitled "Systems and Methods for Personalizing Aggregated News Content" by Bharat et al., filed Mar. 17, 2014, 33 pages.

U.S. Appl. No. 13/371,584, filed Feb. 13, 2012, entitled "Systems and Methods for Syndicating and Hosting Customized News Content," 34 pages.

Bharat et al.,"Personalized, interactive news on the Web," Multimedia Systems, vol. 6, No. 5, pp. 349-358, 1998, http://springerlink.metapress.c.pdf.

Manber et al., "Experience with personalization on yahoo," Communications of the ACM, vol. 43, No. 8, pp. 35-39, 2000, http://delivery.acm.org/10.1145.pdf.

* cited by examiner

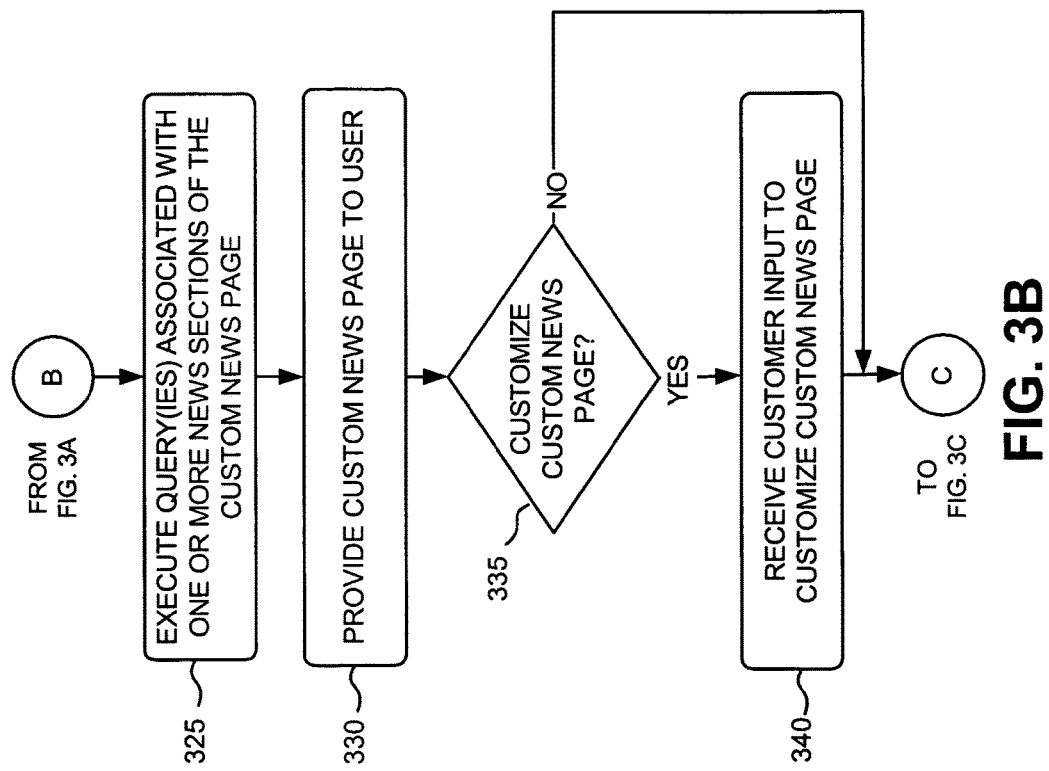

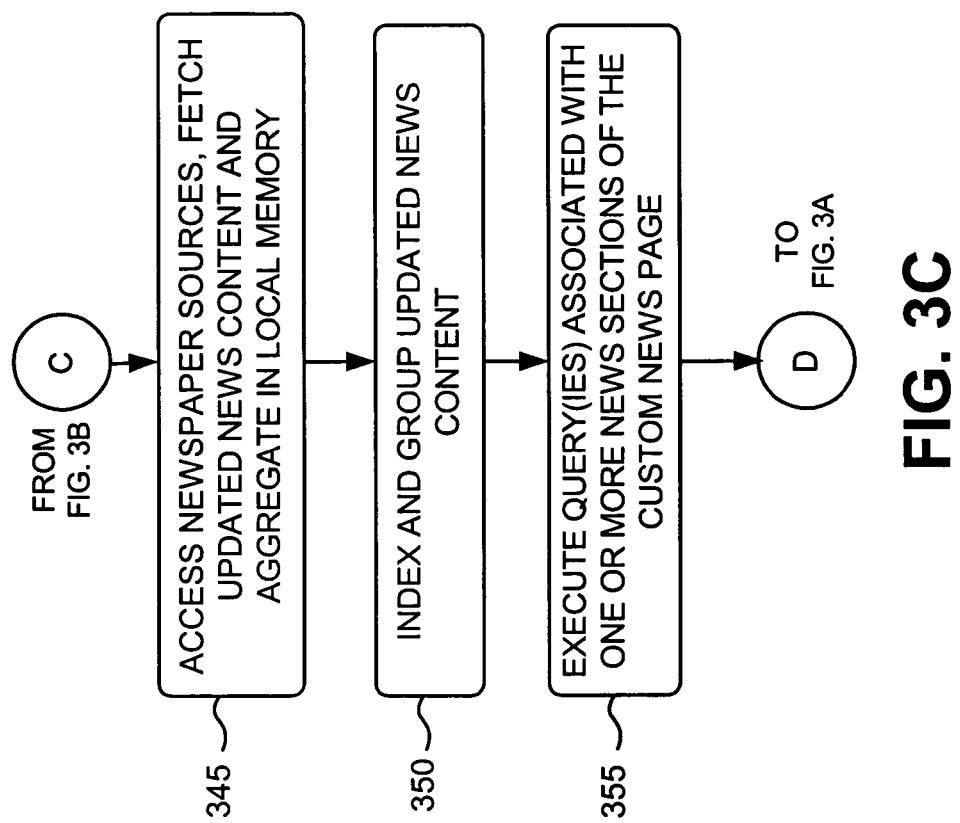

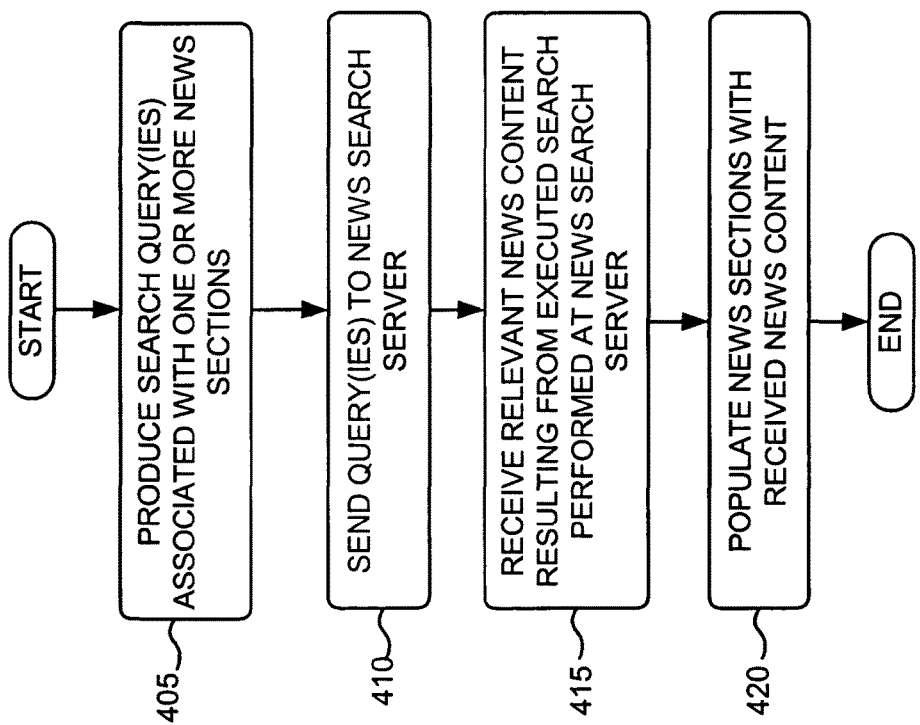

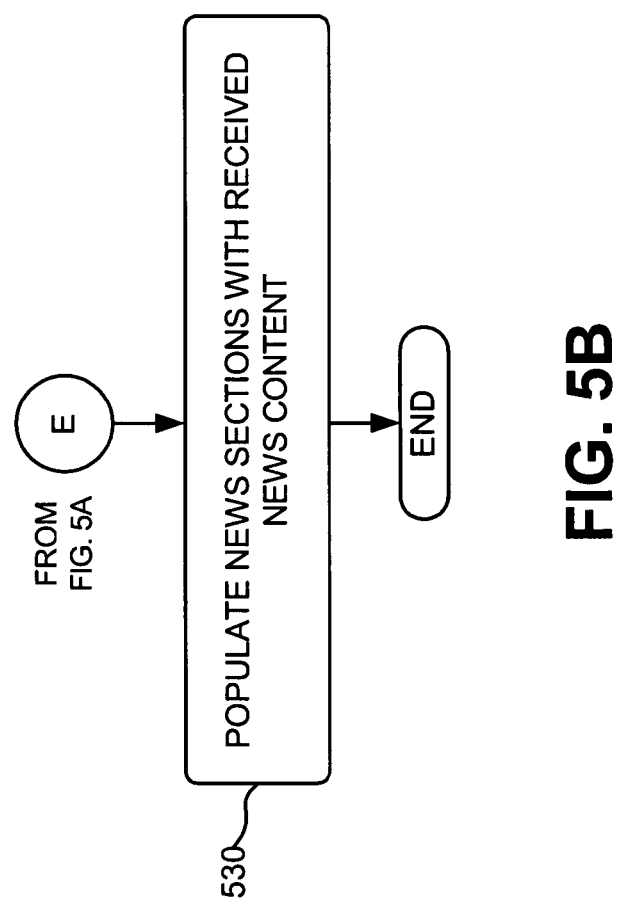

FIG. 6

SYSTEMS AND METHODS FOR SYNDICATING AND HOSTING CUSTOMIZED NEWS CONTENT

RELATED APPLICATION

The present application is a continuation of U.S. patent application Ser. No. 13/371,584, filed Feb. 13, 2012, which is a continuation of U.S. patent application Ser. No. 10/748,661, filed Dec. 31, 2003 (now U.S. Pat. No. 8,126,865), which relates to co-pending U.S. patent application Ser. No. 10/748,663, filed Dec. 31, 2003, the disclosures of which are incorporated by reference herein in their entirety.

BACKGROUND OF THE INVENTION

Field of the Invention

The present invention relates generally to information aggregation systems and, more particularly, to systems and methods for hosting customized news content aggregated by a news aggregation service.

Description of Related Art

Existing news aggregation services (e.g., Google News) search out, and aggregate, news content published on web pages throughout the Internet. In response to a search query from a user, or when a user browses a newspaper section of the news aggregation service, the news aggregation service presents a list of stories, from the aggregated news content, relevant to the query or to the newspaper section requested, with each story involving a group of articles from different publications dealing with the same topic. To keep abreast of developments in the news, users must manually access the news aggregation service, re-enter a search query and view relevant news stories.

Accordingly, it would be desirable to implement a news browsing service that automatically provides news content to a customer based on received customer search criteria.

SUMMARY OF THE INVENTION

Systems and methods, consistent with the principles of the invention, implement a news browsing service that may use search queries, received from a remote server that stores custom news documents, to automatically, and periodically, provide custom news content retrieved from a server that aggregates news content to the remote server. The custom news content may then be hosted at the remote server and accessed by various users. A customer associated with the remote server may customize the content and format of the custom news page.

According to one aspect consistent with the principles of the invention, a method of retrieving news content from a news aggregation server includes hosting first news content at a first news server and receiving user input selecting news content of the first news content. The method further includes sending query data, associated with the selected news content, to the news aggregation server and receiving second news content from the news aggregation server resulting from a search performed at the news aggregation server using the query data. The method also includes hosting the second news content, in conjunction with the first news content, at the first news server.

According to another aspect, a method of creating custom news documents includes periodically producing one or more custom search queries related to news of interest and sending the one or more search queries at periodic intervals across a network to a news search server that aggregates news from multiple news sources. The method further includes receiving news content corresponding to the one or more search queries from the news search server and inserting the news content into the custom news documents. The method also includes permitting access to clients, from across the network, to the custom news documents.

According to a further aspect, a method of providing news content to an external server that hosts customized news content includes fetching news content from multiple news source servers and aggregating the news content. The method further includes periodically receiving one or more search queries from the external server and searching the aggregated news content based on the one or more search queries. The method also includes periodically providing news content to the external server based, at least in part, on results of the searches.

According to yet another aspect, a method of retrieving news content from a news server includes permitting client access to first news content contained in one or more news documents stored at a custom document server and sending query data to the news server based, at least in part, on a portion of the first news content that is accessed by the client. The method further includes receiving second news content from the news server based, at least in part, on the query data and incorporating the second news content into the one or more news documents. The method also includes permitting client access to the second news content at the custom document server.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 3A, 3B and 3C are flowcharts of exemplary processing for hosting a custom news page at a news search server according to an implementation consistent with the principles of the invention;

FIG. 4 is a flowchart of exemplary processing for hosting a custom news page at a custom news server according to an implementation consistent with the principles of the invention;

FIGS. 5A and 5B are flowcharts of exemplary processing for custom news server related news retrieval according to an implementation consistent with the principles of the invention;

FIG. 6 is a diagram of an exemplary news aggregation search page according to an implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention.

Systems and methods consistent with the principles of the invention implement a news browsing service that uses customer provided search queries to automatically, and periodically, provide news content from news aggregated at a news aggregation server to one or more custom news documents hosted by the customer at a custom news server. The customer may customize the content and format of the one or more custom news documents and permit access to the custom news document to networked clients.

A "document," as the term is used herein, is to be broadly interpreted to include any machine-readable and machine-storable work product. A document may include an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.).

Exemplary Network Configuration

Figure 1:
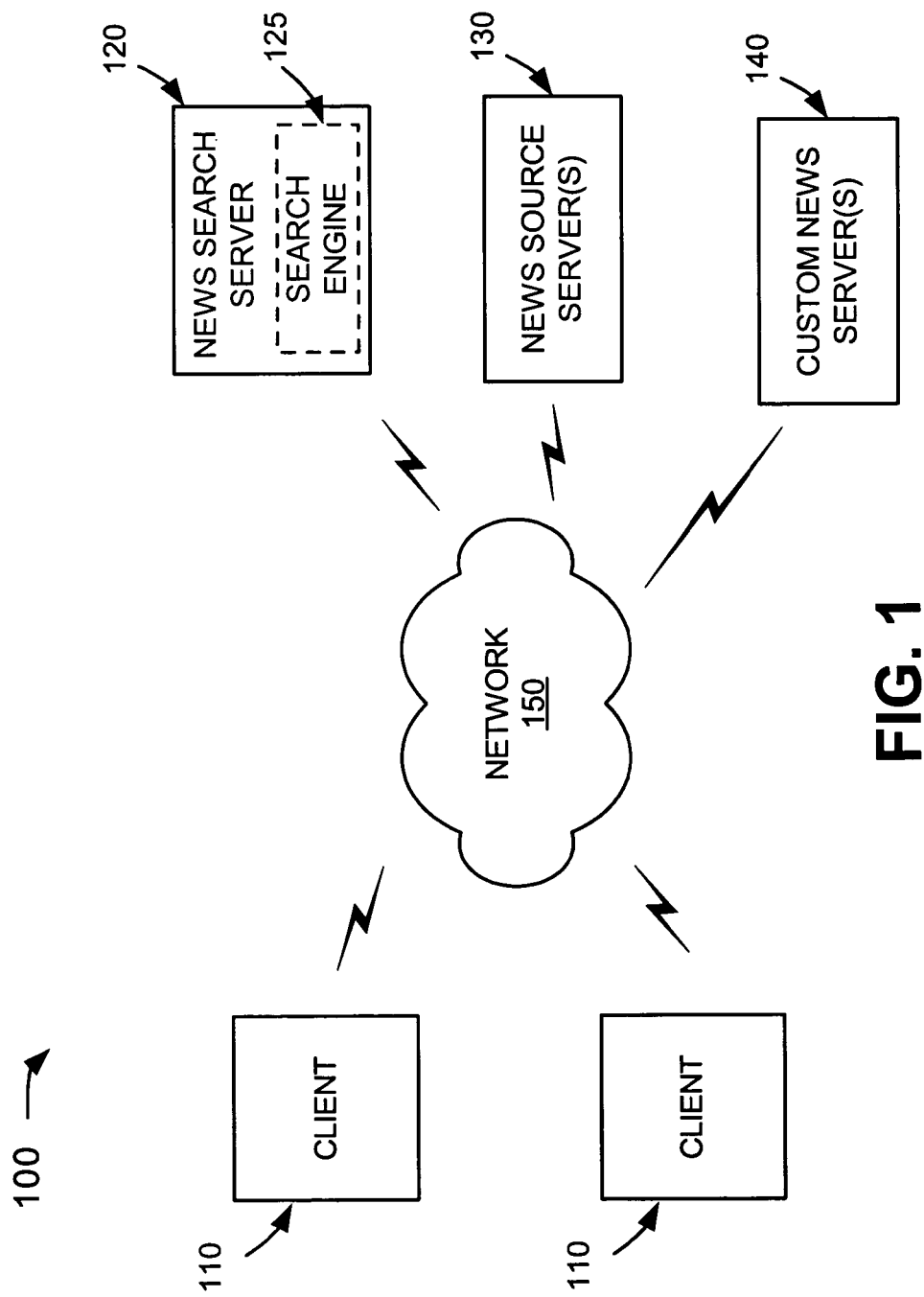
FIG. 1 is a diagram of an exemplary network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to multiple servers 120-140 via a network 150. Network 150 may include a local area network (LAN), a wide area network (WAN), a telephone network, such as the Public Switched Telephone Network (PSTN), an intranet, the Internet, a memory device, another type of network, or a combination of networks. Two clients 110 and three servers 120-140 have been illustrated as connected to network 150 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a laptop, or another type of computation or communication device, a thread or process running on one of these devices, and/or an object executable by one of these devices. Servers 120-140 may include server entities that gather, process, search, and/or maintain documents in a manner consistent with the principles of the invention. Clients 110 and servers 120-140 may connect to network 150 via wired, wireless, and/or optical connections.

In an implementation consistent with the principles of the invention, news search server 120 may include a search engine 125 usable by customers at custom news server(s) 140 and users at clients 110. News search server 120 may implement a news aggregation service by crawling a corpus of news documents (e.g., web pages) hosted on news source server(s) 130 and store information associated with these news documents in a repository of crawled documents. Server(s) 130 may store or maintain news documents that may be crawled by server 120. Such news documents may include recently published news stories, or older (i.e., not recent), archived news stories. Custom news server(s) 140 may offer a news browsing service that hosts news documents that include customized news content received from news search server 120. Custom news server(s) 140 may additionally host news documents that include news content prepared by an entity operating custom news server(s) 140.

The news content hosted at custom news server(s) 140 may be customized in accordance with custom search queries provided to news search server 120. In some implementations, news search server 120 may host news content documents that include news content customized in accordance with custom search queries provided to news search server 120 from custom news server(s) 140. An entity operating custom news server(s) 140 may, thus, act as a "customer" of the news aggregation service implemented on news search server 120. Users associated with clients 110 may access, via network 150, custom news content stored at custom news server(s) 140.

While servers 120-140 are shown as separate entities, it may be possible for one or more of servers 120-140 to perform one or more of the functions of another one or more of servers 120-140. For example, it may be possible that two or more of servers 120-140 are implemented as a single server. It may also be possible for a single one of servers 120-140 to be implemented as two or more separate (and possibly distributed) devices.

Exemplary Client/Server Architecture

Figure 2:
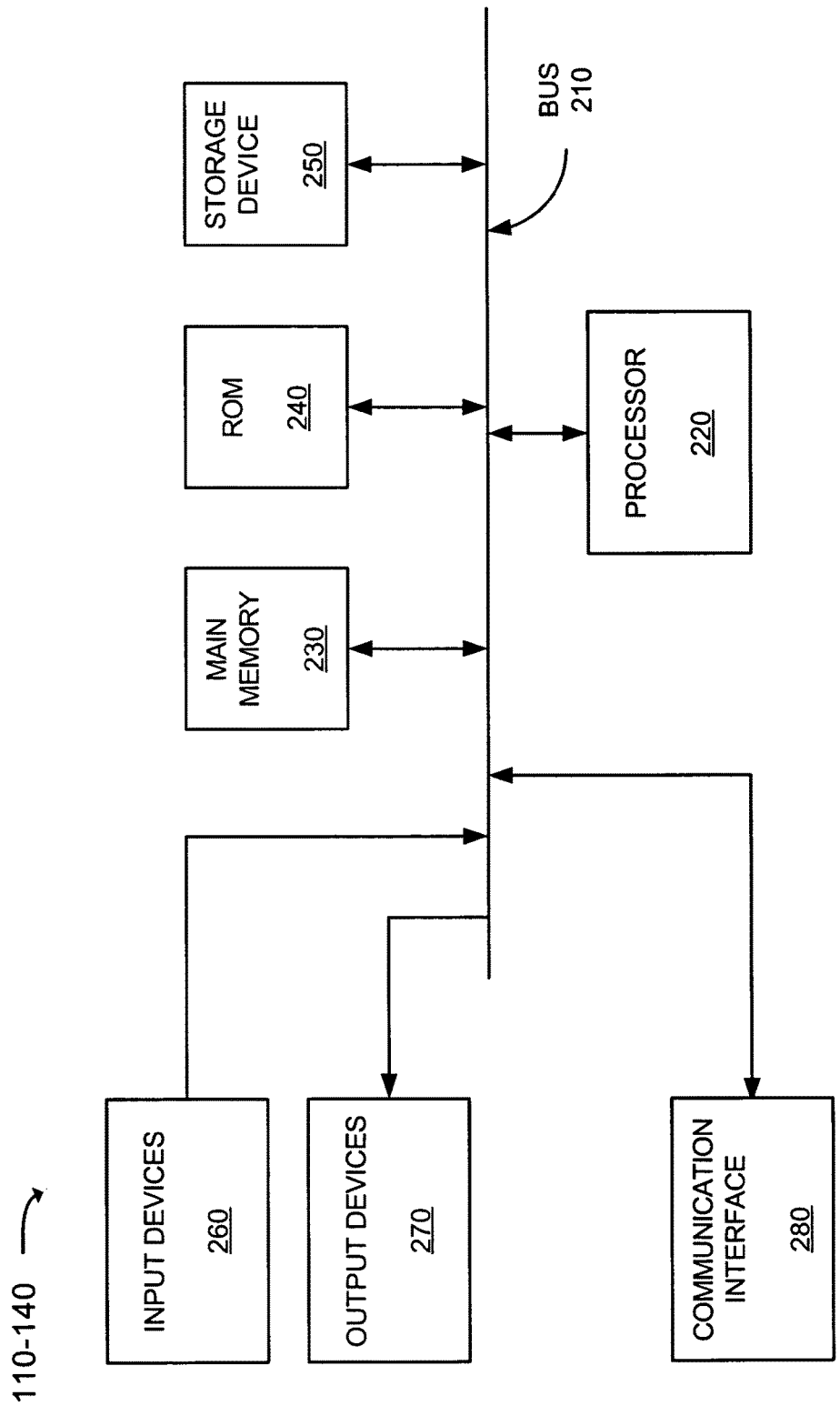
FIG. 2 is an exemplary diagram of a client and/or server of FIG. 1 in an implementation consistent with the principles of the invention.

FIG. 2 is an exemplary diagram of a client or server entity (hereinafter called "client/server entity"), which may correspond to one or more of clients 110 and servers 120-140, according to an implementation consistent with the principles of the invention. The client/server entity may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of the client/server entity.

Processor 220 may include one or more types of conventional processors or microprocessors that interpret and execute instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit an operator to input information to the client/server entity, such as a keyboard, a mouse, a pen, voice recognition and/or biometric mechanisms, etc. Output device(s) 270 may include one or more conventional mechanisms that output information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

As will be described in detail below, the client/server entity, consistent with the principles of the invention, perform certain searching-related operations. The client/server entity may perform these operations in response to processor 220 executing software instructions contained in a computer-readable medium, such as memory 230. A computer-readable medium may be defined as one or more physical or logical memory devices and/or carrier waves.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing for Hosting Custom News Page at News Search Server

Figure 3A:
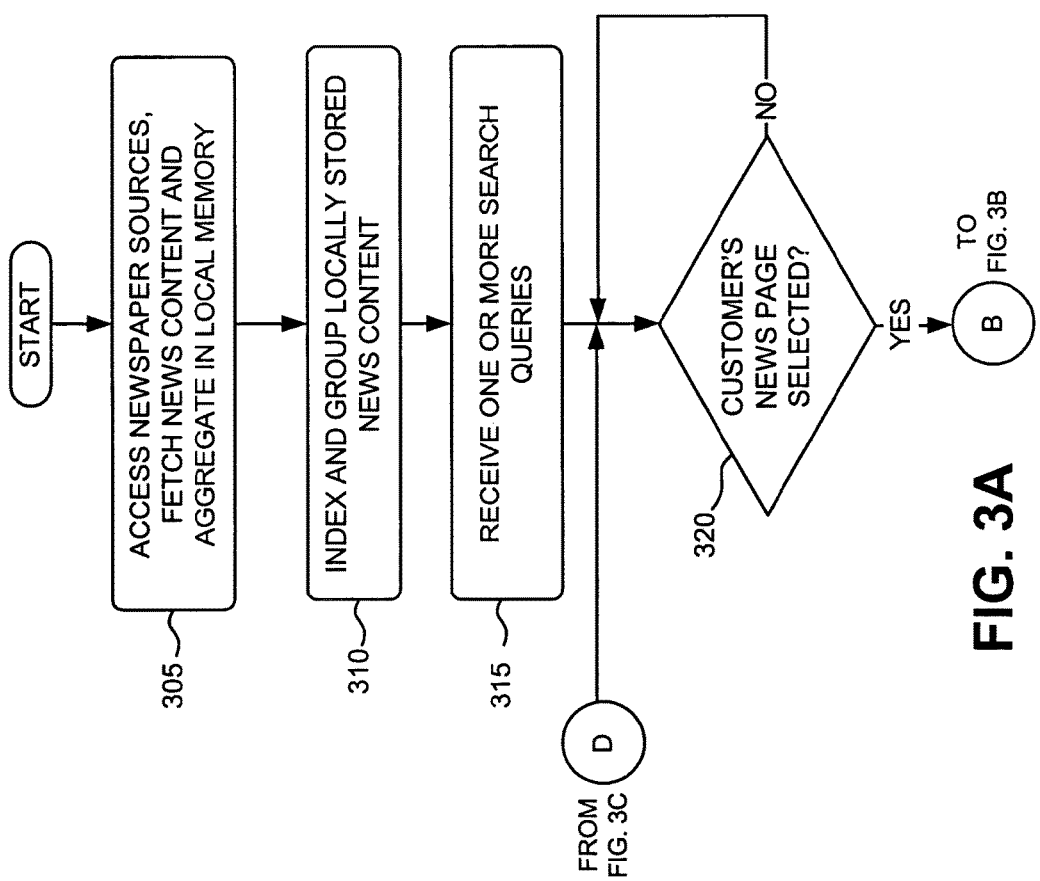

FIGS. 3A, 3B and 3C are flowcharts of exemplary processing for hosting a customer's customized news content at news search server 120 according to an implementation consistent with the principles of the invention. In this implementation, news search server 120 may locally store and maintain news content for an external entity, associated with custom news server 140, according to search queries provided by the external entity.

Processing may begin with news search server 120 accessing external news content (e.g., from server 130), fetching the news content and aggregating the fetched news content in a local memory (act 305)(FIG. 3A). For example, server 120 may use a news crawler (e.g., web robot) that may access news content documents hosted by news source server(s) 130. News source server(s) 130 may host, for example, news content from the Washington Post, the New York Times, or other news content sites. The fetched news content may then be indexed and grouped, using conventional indexing and grouping techniques (act 310).

Server 120 may receive one or more search queries from a custom news server 140 (e.g., the "customer") (act 315). A number of forms of search queries may be supported by server 120, including the following search query forms: (a) one or more keywords (e.g., 'bush,' bush iraq,' etc.); (b) topical categories (e.g., 'topic=sports,' 'topic=sport-basketball'; (c) geographical categories (e.g., 'geo=usa,' 'geo=north America,' 'geo=china'); and/or (d) combinations of the above (e.g., 'tennis topic=sports', geo=europe'). For example, a personal "wireless" news section can be seeded with two queries: 'wireless topic=science' and 'cell phone topic=technology.' An operator of custom news server 140 may compensate an operator of news search server 120 for hosting news content at news search server 120 according to the one or more received search queries. In one implementation, the operator of news search server 120 may be compensated by hosting, and monetizing, advertisements received from the operator of custom news server 140.

Figure 6:
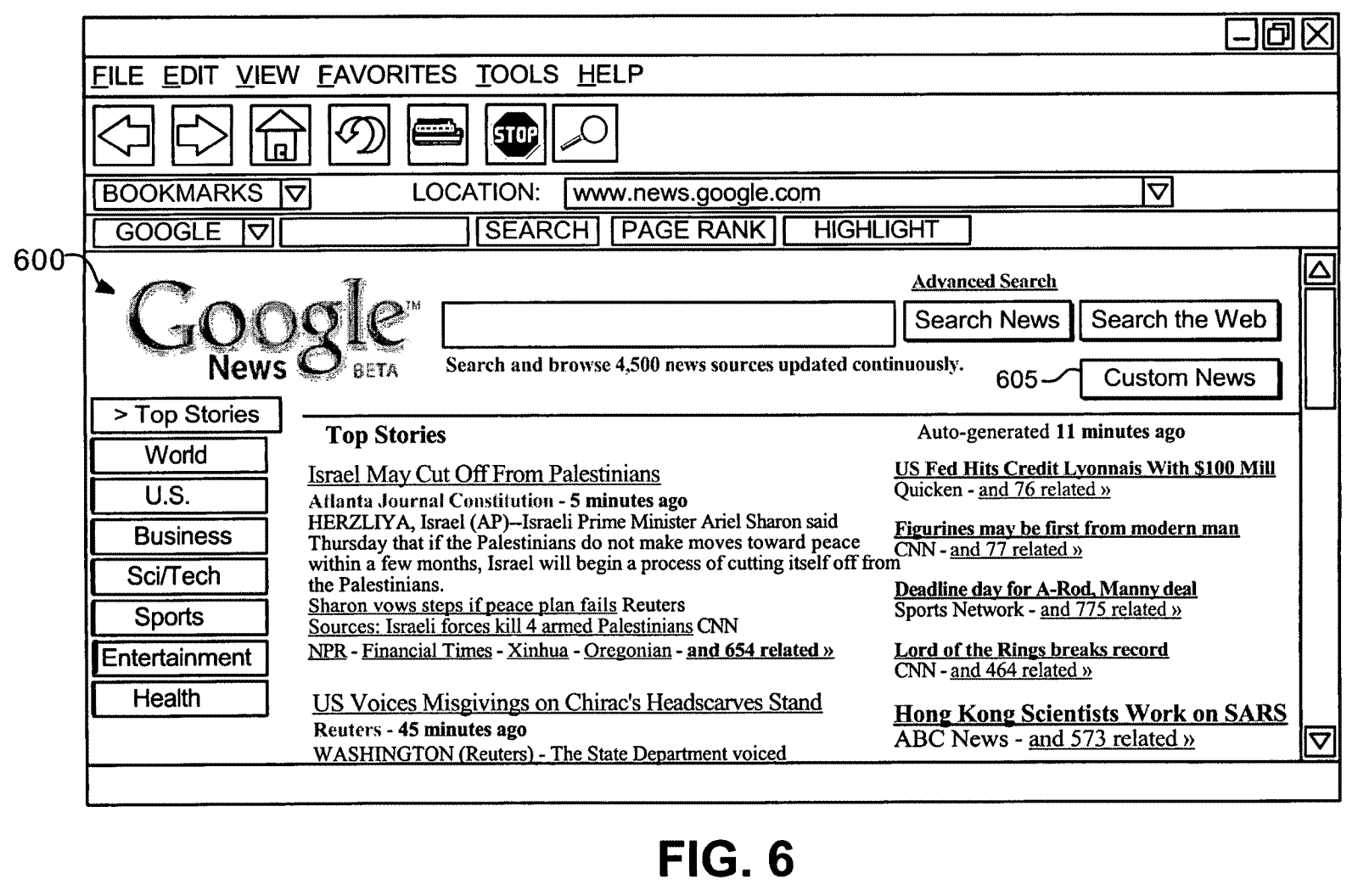
Figure 7:
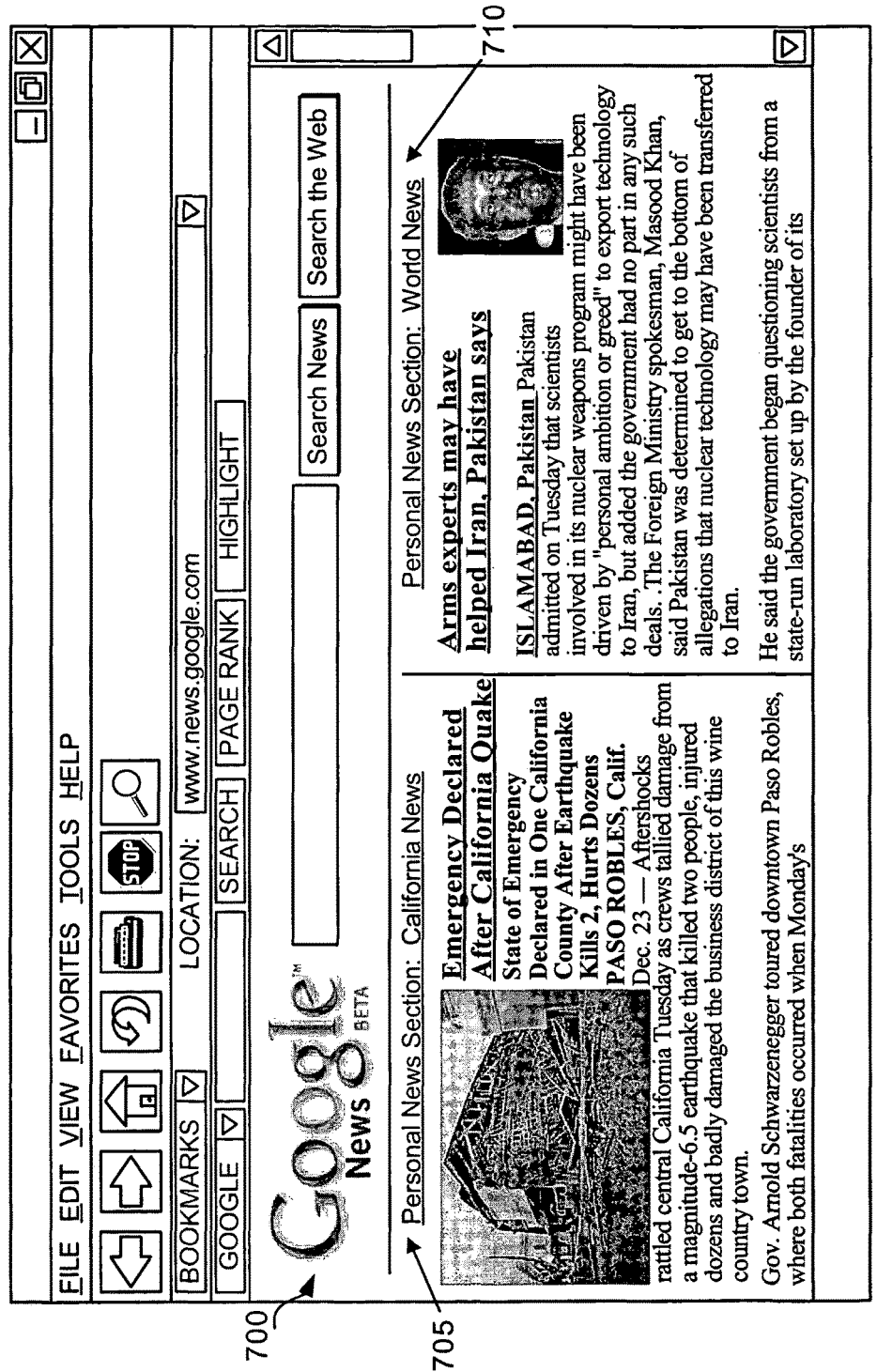
FIG. 7 is a diagram of an exemplary custom news page according to an implementation consistent with the principles of the invention.

Server 120 may determine whether a user, associated with a client 110, has selected the customer's news page hosted at server 120 (act 320). For example, as shown in FIG. 6, a user may "click" on the "Custom News" button 605 of a news search page 600 of a news aggregation service associated with server 120. If the user has selected the customer's news page, server 120 may then execute one or more queries associated with one or more news sections of the customer's custom news page (act 325)(FIG. 3B). Server 120 may execute the one or more search queries to search through news content previously aggregated in local memory. Server 120 may then provide a custom news page to the user (act 330) by sending one or more documents to the user containing the customer's custom news page. The one or more documents may additionally include content authored by an operator (e.g., a "blog") of custom news server 140 and previously provided to news search server 120. The customer's custom news page may be formatted similar to a human-compiled newspaper, with a title, short introduction, related story titles, data, photo, etc. By way of example, FIG. 7 illustrates a personal news page 700 that includes two news sections 705 and 710, "California News" and "World News," respectively. The customer's custom news page may additionally be used to produce a similarly configured print newspaper in a viewable or hard copy format. For example, a postscript or pdf file may be produced that is portable for viewing and ready to print for offline reading. In one implementation, the layout of the print newspaper may be separately specified from the custom news page hosted on server 120.

Server 120 may determine whether the customer desires to customize its custom news page (act 335). If not, processing may continue at act 345. If the customer does desire to customize its custom news page, then server 120 may receive input from the customer to customize the customer's custom news page (act 345)(FIG. 3C). An interactive program (known as a Wizard) may execute at server 120, or at customer news server 140, to walk the customer through the process of adding news sections, placing them appropriately, and customizing their look and feel.

Customers can customize their custom news page in many ways, including the following: (a) adding a new section seeded with new queries; (b) changing the appearance or location of a news section or the queries associated with a news section; (c) moving news sections around (e.g., from top left of news page to bottom right, from 2 columns to 1 column layout, etc.); (d) deleting a news section; (e) changing display properties for news within a news section (e.g., deciding how many stories the news section should have, how many related titles within a story, whether images should be shown, etc.); and (f) changing ranking properties within a news section. When changing ranking properties within a news section, the customer may decide how freshness of the news content should be valued, such as, for example, sorting news content by time, by importance, or by some combination, or by providing hints for ranking certain types of stories above other stories. Additionally, the customer may indicate that a certain kind of news source (e.g., New York Times, sources in USA, etc.) may be preferred or not preferred. Also, the customer may provide general keywords that are of interest to the user (e.g., San Francisco) and stories with these keywords should be boosted. Further, the customer can list journalists they like or do not like or genres they like or do not like (e.g., opinion/commentary vs. breaking news vs. briefs vs. full coverage). Those skilled in the art can devise user interfaces that allow such preferences to be expressed either in the context of one particular news section, or all sections together.

Server 120 may access external news content (e.g., from server 130), fetch updated news content and aggregate the updated news content in local memory (act 345). For example, server 120 may use a news crawler (e.g., web robot) that may access updated news content documents hosted by news source server(s) 130. The fetched updated news content may be indexed and grouped, using conventional indexing and grouping techniques (act 350). Server 120 may then, periodically, execute a query(ies) associated with one or more news sections of the customer's custom news page (act 355). Processing may then return to act 320 (FIG. 3A) to determine if a user has again selected the customer's custom news page to view updated, customized news content.

Exemplary Processing for Hosting Custom News Page at Custom News Server

FIG. 4 is a flowchart of exemplary processing for receiving customized news content from news search server 120 and hosting the news content at custom news server 140 according to an implementation consistent with the principles of the invention. In this implementation, custom news server 140 may locally store news content received from news search server 120 based on search queries provided by custom news server 140 to news search server 120.

Processing may begin with custom news server 140 producing one or more search queries associated with one or more news sections (act 405)(FIG. 4). The produced search queries may be related to news content that an operator of customer news server 140 desires to host on custom news server 140. Custom news server 140 may then send the one or more queries to news search server 120 via, for example, network 150 (act 410). News search server 120, upon receipt of the one or more queries, may execute conventional search algorithms using the one or more queries to retrieve relevant news content from aggregated news content stored in local memory. News search server 120 may send the relevant news content to custom news server 140 via network 150.

Custom news server 140 may then receive relevant news content resulting from an executed search of the one or more queries performed at news search server 120 (act 415). Custom news server 140 may populate locally stored news sections with the news content received from news search server 120 (act 420). The customer associated with custom news server 140 may, thus, create its own "on-line" newspaper by combining external news which may come from a set of dynamic queries executed at news search server 120 with news content created locally at custom news server 140. Such locally created news content may include, for example, an editorial section that may be maintained using "blogging" technology.

The exemplary processing of FIG. 4 may be repeated periodically such that news content may be retrieved from news search server 120 using dynamic search queries to periodically update news content hosted on custom news server 140.

Exemplary Processing for Custom News Server Related News Retrieval

Figure 5A:
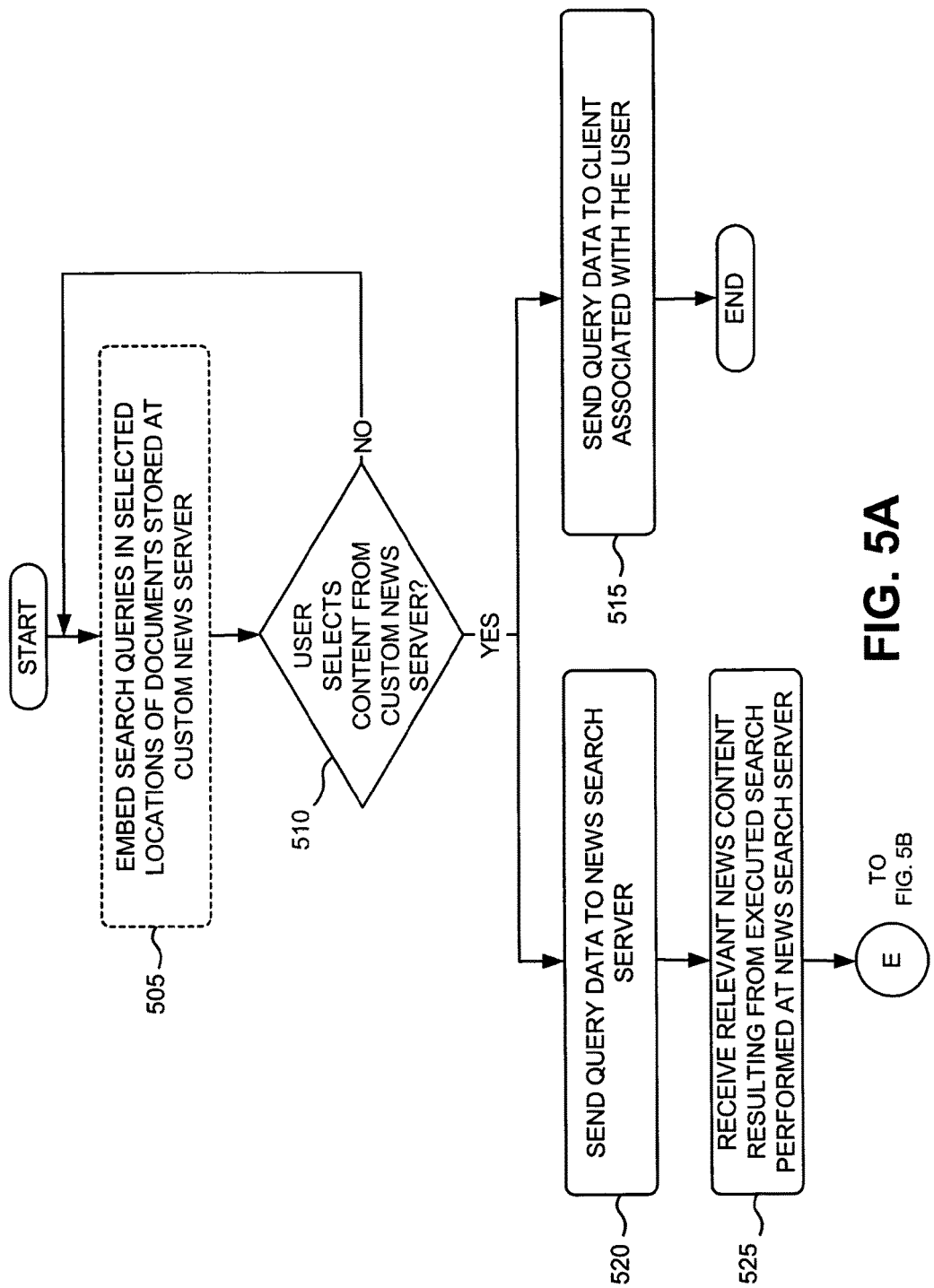

FIGS. 5A and 5B are flowcharts of exemplary processing for retrieving news, related to news content locally stored at the custom news server 140, from news search server 120 according to an implementation consistent with the principles of the invention. In the implementation described with respect to FIGS. 5A and 5B, a customer associated with custom news server 140 may link all or some of its locally created news content with related news stored at news search server 120. When a user selects a link on a custom news page of custom news server 140, a search may be executed at news search server 120 to retrieve relevant, related news content that can be provided to the user.

Processing may begin with custom news server 140 optionally embedding search queries in selected locations of news content documents stored at custom news server 140 (act 505). For example, HTML Iframes may be used at custom news server 140 to load one or more dynamic news queries. Custom news server 140 may then determine if a user, associated with a client 110, has selected news content stored at custom news server 140 (act 510). If so, custom news server 140 may send query data to the client 110 associated with the user (act 515). The query data may include embedded search queries that may, in turn, be provided by client 110 to new search server 120. In some implementations, the embedded search queries may be in the form of an "applet" or an "iframe." News search server 120 may execute a conventional search technique using the search queries received from client 110 to retrieve relevant news content from aggregated news content stored in local memory. News search server 120 may then return the retrieved news content to client 110.

In an alternative implementation, if the user has selected news content stored at custom news server 140, custom news server 140 may send query data to news search server 120 (act 520). The query data may include search queries that were embedded within the news content selected by the user. The query data may also include the Uniform Resource Locator (URL), or some of the text, of the news document hosted at custom news server 140. Subsequent to receiving the query data, news search server 120 may execute a conventional search technique using the query data to retrieve relevant news content from aggregated news content stored in local memory and return the retrieved news content to custom news server 140.

In one implementation, based on the URL received from custom news server 140, news search server 120 may fetch the news document corresponding to the URL hosted at custom news server 140 and an appropriate query, based on keywords of the news document, can be generated that can be executed by search engine 125 to find related news content. In another implementation, a suitable query can be devised, based on text given to news search server 120, which can be executed by search engine 125 to retrieve related news content. In a further implementation, search engine 125 can provide a ranked list of other news content accessed by users who accessed the URL sent from custom news server 140. In yet another implementation, given a URL from custom news server 140, search engine 125 may locate a group of related news content to which the given URL belongs. For example, based on a previous grouping of all news searched on the "web," news search engine 125 may already have created groups of related news content. Based on this previous grouping, search engine 125 may determine the group of related news content with which the given URL has been grouped. The remaining news content in this group may then be returned to custom news server 140.

Custom news server 140 may then receive relevant news content resulting from the executed search performed at news search server 120 using the query data (act 525). Custom news server 140 may populate news sections of locally stored news documents with relevant news content received from news search server 120 (act 530)(FIG. 5B).

CONCLUSION

Systems and methods consistent with the principles of the invention may use received customer search criteria to automatically, and periodically, provide custom news content to a remote custom news server. The custom news content may, at the custom news server, be integrated with local news content and provided to clients who desire to access the news content via the custom news server.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 3A, 3B, 3C, 4, 5A and 5B, the order of the acts may be modified in other implementations consistent with the principles of the invention. Also, non-dependent acts may be performed in parallel.

As one skilled in the art will appreciate, the processing exemplified by FIGS. 3A, 3B, 3C, 4, 5A and 5B can be implemented in software and stored on a computer-readable memory, such as main memory 230, ROM 240 or storage device 250 of server 120 or server 140, as appropriate. Alternatively, the processing exemplified by FIGS. 3A, 3B, 3C, 4, 5A and 5B can be implemented in hardwired circuitry, such as combinational logic, within server 120 or server 140, as appropriate. It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

What is claimed is:

1. A system comprising:
   one or more computer devices to:
   determine, for a particular user, information identifying a topic of interest associated with the particular user,
   generate, for the particular user, a custom document that includes a plurality of custom sections,
   determine content of a first custom section of the custom document based on the identified topic of interest,
   generate a search query based on the content of the first custom section of the custom document,
   embed the search query in a selected location within a specific content of the first custom section of the custom document,
   responsive to a selection of the specific content of the first custom section of the custom document by the particular user, search for related content to be populated into a second custom section of the custom document based on the search query embedded in the selected location within the specific content of the first custom section of the custom document,
   populate the first custom section of the custom document with the content and the second custom section of the custom document with the related content searched based on the search query embedded in the selected location within the specific content of the first custom section to form a populated custom document, and
   provide the populated custom document for presentation.

2. The system of claim 1, where the one or more computer devices are further to:
   determine content related to another user, and
   populate a third custom section, of the plurality of custom sections, with the content related to the other user.

3. The system of claim 2, where, when determining the content related to the other user, the one or more computer devices are to:
   identify the content related to the other user based on access of the other user to at least a portion of the content.

4. The system of claim 1, where the one or more computer devices, when determining the information identifying the topic of interest associated with the particular user, are to:
   provide an interface that enables the particular user to provide the information, and
   receive the information from the particular user via the interface.

5. The system of claim 1, where the one or more computer devices are further to:
   determine one or more preferences associated with the particular user with respect to the populated custom document, and
   modify the populated custom document based on the one or more preferences, and
   where the one or more computer devices, when modifying the populated custom document, are to at least one of:
   modify a position for the first custom section in the populated custom document,
   modify an appearance of the first custom section in the populated custom document,
   add, in the populated custom document, an additional section to the plurality of custom sections,
   remove, from the populated custom document, one of the plurality custom sections,
   modify an appearance of the content in the first custom section, or
   specify an amount of the content to include in the first custom section.

6. The system of claim 1, where the one or more computer devices are further to:
   determine one or more preferences associated with the particular user with respect to the first custom section, and
   modify, based on the one or more preferences, the search query embedded in the first custom section to specify at least one of:
   one or more sources from which to obtain the content,
   one or more filtering criteria to specify a portion of the content to include in the first custom section,
   a ranking criterion to sort the content within the first custom section,
   information associated with a keyword, a phrase, another topic, or a geographic location to include in the search query,
   an author of the content, or
   a time period for the content.

7. The system of claim 1, where the one or more computer devices are further to:
   receive data from the particular user, and
   populate a third custom section, of the plurality of custom sections, based on the data received from the particular user.

8. A method comprising:
   determining, by one or more processors associated with a device, information identifying a topic of interest associated with a particular user;
   generating, by the one or more processors and for the particular user, a custom document that includes a plurality of custom sections;
   determining content of a first custom section of the custom document based on the identified topic of interest,
   generating a search query based on the content of the first custom section of the custom document;

embedding, by the one or more processors, the search query in a selected location within a specific content of the first custom section of the custom document;

responsive to a selection of the specific content of the first custom section of the custom document by the particular user, searching for related content to be populated into a second custom section of the custom document based on the search query embedded in the selected location within the specific content of the first custom section of the custom document;

populating, by the one or more processors, the first custom section of the custom document with the content and the second custom section of the custom document with the related content searched based on the search query embedded in the selected location within the specific content of the first custom section to form a populated custom document; and providing, by the one or more processors, the populated custom document for presentation.

9. The method of claim 8, where determining the information includes:
providing an interface that enables the particular user to provide the information; and
receiving the information from the particular user via the interface.

10. The method of claim 8, where determining the information includes:
receiving a selection, associated with the particular user, corresponding to second content that differs from the related content; and
determining the information based on the second content.

11. The method of claim 8, further comprising:
identifying one or more preferences associated with the particular user with respect to the populated custom document; and
modifying the populated custom document based on the one or more preferences,
modifying the populated custom document including:
modifying a position for the first custom section in the populated custom document,
modifying an appearance of the first custom section in the populated custom document,
adding, in the populated custom document, an additional section to the plurality of custom sections,
removing, from the populated custom document, one of the plurality custom sections,
modifying an appearance of the content in the first custom section, or
specifying an amount of the content to include in the first custom section.

12. The method of claim 8, further comprising:
identifying one or more preferences associated with the particular user with respect to the first custom section; and
modifying, based on the one or more preferences, the search query embedded in the first custom section to specify at least one of:
one or more sources from which to obtain the content,
one or more filtering criteria to specify a portion of the content to include in the first custom section,
a ranking criterion to sort the content within the first custom section,
information associated with a keyword, a phrase, another topic, or a geographic location to include in the search query,
an author of the content, or
a time period for the content.

13. The method of claim 8, where the embedded search query is in the form of an applet or a hypertext markup language (HTML) iframe.

14. The method of claim 8, further comprising:
receiving a request from another user to access the populated custom document, and
providing the populated custom document to the other user based on receiving the request.

15. The method of claim 8, further comprising:
identifying at least one selection, by another user, associated with the content related to the embedded search query;
determining, based on the at least one selection, other content that differs from the related content; and
populate a third custom section, of the plurality of custom sections, with the other content.

16. A non-transitory computer-readable medium to store instructions, the instructions comprising:
one or more instructions which, when executed by at least one processor associated with a device, cause the at least one processor to:
determine, for a particular user, information identifying a topic of interest associated with the particular user,
generate, for the particular user, a custom document that includes a plurality of custom sections,
determine content of a first custom section of the custom document based on the identified topic of interest,
generate a search query based on the content of the first custom section of the custom document,
embed the search query in a selected location within a specific content of the first custom section of the custom document,
responsive to a selection of the specific content of the first custom section of the custom document by the particular user, search for related content to be populated into a second custom section of the custom document based on the search query embedded in the selected location within the specific content of the first custom section of the custom document,
populate the first custom section of the custom document with the content and the second custom section of the custom document with the related content searched based on the search query embedded in the selected location within the specific content of the first custom section to form a populated custom document, and
provide the populated custom document for presentation.

17. The non-transitory computer-readable medium of claim 16, where the instructions, to determine the information, further include:
one or more instructions to:
receive the information from the particular user, or
determine the information based on selections, associated with the particular user, from other content.

18. The non-transitory computer-readable medium of claim 16, where the embedded search query is in the form of an applet or a hypertext markup language (HTML) iframe.

19. The non-transitory computer-readable medium of claim 16, where the instructions further comprise:
one or more instructions to:
receive a request from another user to access the populated custom document, and
provide the populated custom document to the other user based on receiving the request.

20. The non-transitory computer-readable medium of claim 16, where the instructions further comprise:
   one or more instructions to:
      identify portions of the content, accessed by another user,
      determine, based on the identified portions of the content, other content that differs from the related content, and
      populate a third custom section, of the plurality of custom sections, with the other content.

* * * * *